US012499836B2

(12) United States Patent
Her et al.

(10) Patent No.: US 12,499,836 B2
(45) Date of Patent: Dec. 16, 2025

(54) ELECTROLUMINESCENT DISPLAY APPARATUS

(71) Applicant: LG Display Co., Ltd., Seoul (KR)

(72) Inventors: Jin Her, Paju-si (KR); Hoon Jeong, Paju-si (KR); Chul Sang Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/919,834

(22) Filed: Oct. 18, 2024

(65) Prior Publication Data

US 2025/0046250 A1 Feb. 6, 2025

Related U.S. Application Data

(62) Division of application No. 17/966,347, filed on Oct. 14, 2022, now Pat. No. 12,148,377.

(30) Foreign Application Priority Data

Dec. 16, 2021 (KR) ........................ 10-2021-0180763

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01);
(Continued)

(58) Field of Classification Search
CPC .. G09G 3/3233; G09G 3/2096; G09G 3/3208; G09G 2300/0819;
(Continued)

(56) References Cited

U.S. PATENT DOCUMENTS

| | | | |
|---|---|---|---|
| 9,047,813 | B2 | 6/2015 | Minami et al. |
| 9,786,222 | B2 | 10/2017 | Lim et al. |

(Continued)

OTHER PUBLICATIONS

United States Office Action, U.S. Appl. No. 17/966,347, filed Dec. 21, 2023, 19 pages.

(Continued)

*Primary Examiner* — Christopher E Leiby
(74) *Attorney, Agent, or Firm* — Fenwick & West LLP

(57) ABSTRACT

An electroluminescent display apparatus includes a plurality of pixels that each include a driving element including a first gate electrode connected to a first gate node, a second gate electrode facing the first gate electrode, a source electrode connected to a source node, and a drain electrode, a light emitting device connected between the source node and an input terminal for a low level driving voltage to emit light during an emission period, and an internal compensation circuit including a first capacitor connected to the first gate node and the source node. The internal compensation circuit samples a threshold voltage of the driving element during a sampling period that precedes the emission period. A sampling reinforcement voltage for increasing a sampling current flowing in the driving element is applied to the second gate electrode of the driving element during the sampling period.

5 Claims, 10 Drawing Sheets

(52) U.S. Cl.
CPC ............... *G09G 2300/0828* (2013.01); *G09G 2300/0852* (2013.01); *G09G 2310/0286* (2013.01); *G09G 2310/0289* (2013.01); *G09G 2310/0294* (2013.01); *G09G 2330/021* (2013.01)

(58) Field of Classification Search
CPC ... G09G 2300/0828; G09G 2300/0852; G09G 2300/0861; G09G 2300/0426; G09G 2300/043; G09G 2310/0286; G09G 2310/0289; G09G 2310/0294; G09G 2310/0251; G09G 2310/0262; G09G 2330/021; G09G 2320/0233; G09G 2320/043
See application file for complete search history.

(56) References Cited

U.S. PATENT DOCUMENTS

| | | | |
|---|---|---|---|
| 10,002,972 | B2 | 6/2018 | Miyake |
| 10,163,948 | B2 | 12/2018 | Ohmaru |
| 10,242,620 | B2 | 3/2019 | Zhu et al. |
| 10,262,595 | B2 | 4/2019 | Zhang |
| 10,395,598 | B2 | 8/2019 | Chen et al. |
| 10,777,128 | B2 | 9/2020 | Feng et al. |
| 11,127,350 | B2 | 9/2021 | Gai et al. |
| 11,257,429 | B2 | 2/2022 | Jeong |
| 11,270,639 | B2 | 3/2022 | Yamamoto |
| 11,282,460 | B2 | 3/2022 | Teraguchi |
| 11,380,263 | B2 | 7/2022 | Yoon et al. |
| 11,386,854 | B2 | 7/2022 | Kim et al. |
| 11,417,273 | B2 | 8/2022 | Toyotaka et al. |
| 2010/0053041 | A1 | 3/2010 | Abe et al. |
| 2011/0273419 | A1 | 11/2011 | Park et al. |
| 2013/0063413 | A1 | 3/2013 | Miyake |
| 2014/0168194 | A1 | 6/2014 | Kong et al. |
| 2015/0171156 | A1 | 6/2015 | Miyake |
| 2015/0187276 | A1 | 7/2015 | Shim et al. |
| 2016/0042694 | A1 | 2/2016 | Lim et al. |
| 2016/0260373 | A1 | 9/2016 | Miyake |
| 2016/0329392 | A1 | 11/2016 | Miyake |
| 2017/0365213 | A1 | 12/2017 | Rieutort-Louis et al. |
| 2018/0114799 | A1 | 4/2018 | Miyake |
| 2018/0190194 | A1 | 7/2018 | Zhu et al. |
| 2018/0268757 | A1 | 9/2018 | Chen et al. |
| 2018/0268760 | A1 | 9/2018 | Chen et al. |
| 2019/0164476 | A1 | 5/2019 | Feng et al. |
| 2020/0135091 | A1 | 4/2020 | Kim |
| 2020/0194471 | A1 | 6/2020 | Miyake |
| 2021/0125556 | A1 | 4/2021 | Yamamoto |
| 2021/0210573 | A1 | 7/2021 | Wang et al. |
| 2023/0261010 | A1 | 8/2023 | Miyake |
| 2023/0360590 | A1* | 11/2023 | Jeong .................. G09G 3/3233 |

OTHER PUBLICATIONS

United States Office Action, U.S. Appl. No. 17/966,347, filed Apr. 23, 2024, 20 pages.

* cited by examiner

ELECTROLUMINESCENT DISPLAY APPARATUS

CROSS-REFERENCE TO RELATED APPLICATION

This application is a divisional of U.S. patent application Ser. No. 17/966,347 filed on Oct. 14, 2022, which claims the benefit of Republic of Korea Patent Application No. 10-2021-0180763 filed on Dec. 16, 2021, each of which is hereby incorporated by reference in its entirety.

TECHNICAL FIELD

The present disclosure relates to an electroluminescent display apparatus.

BACKGROUND

Electroluminescent display apparatuses include a plurality of pixels arranged as a matrix type and supply pixels with image data synchronized with a scan signal. Thus, the pixels implement luminance corresponding to the image data. Each of the plurality of pixels includes a driving element, which generates a driving current corresponding to image data, and a light emitting device which emits light having brightness proportional to a level of the driving current.

A level of the driving current is determined based on a gate-source voltage of the driving element and a threshold voltage of the driving element. However, in the pixels, the threshold voltage of the driving element may be shifted due to a pixel process deviation and a degradation deviation of the driving element caused by an increase in use time.

Luminance implemented in the pixels is proportional to a level of the driving current. Due to this, when the threshold voltage of the driving element differs between pixels, a luminance deviation may occur in pixels which have received the same image data. Such a luminance deviation degrades display quality.

SUMMARY

To overcome the aforementioned problem of the related art, the present disclosure may provide an electroluminescent display apparatus in which a threshold voltage of a driving element is sampled and compensated for in an operation process of a pixel, and thus, luminance implemented in the pixel is irrelevant to a variation of the threshold voltage.

The present disclosure may provide an electroluminescent display apparatus which may accurately sample a threshold voltage of a driving element in an operation process of a pixel.

To achieve these objects and other advantages and in accordance with the purpose of the disclosure, as embodied and broadly described herein, an electroluminescent display apparatus includes a plurality of pixels, wherein each of the plurality of pixels includes a driving element including a first gate electrode connected to a first gate node, a source electrode connected to a source node, and a drain electrode supplied with a high level driving voltage, a light emitting device connected between the source node and an input terminal for a low level driving voltage to emit light with a driving current applied from the driving element in an emission period, and an internal compensation circuit including a first capacitor connected to the first gate node and the source node and sampling a threshold voltage of the driving element to reflect the sampled threshold voltage in a gate-source voltage of the driving element in a sampling period preceding the emission period, the driving element further includes a second gate electrode facing the first gate electrode, and a sampling reinforcement voltage for increasing a sampling current flowing in the driving element is applied to the second gate electrode of the driving element in the sampling period.

In another aspect of the present disclosure, an electroluminescent display apparatus includes a plurality of pixels, wherein each of the plurality of pixels includes a driving element including a first gate electrode connected to a first gate node, a source electrode connected to a source node, and a drain electrode supplied with a high level driving voltage, a light emitting device connected between the source node and an input terminal for a low level driving voltage to emit light with a driving current applied from the driving element in an emission period, and an internal compensation circuit including a first capacitor connected to the first gate node and the source node and sampling a threshold voltage of the driving element to reflect the sampled threshold voltage in a gate-source voltage of the driving element in a sampling period preceding the emission period, the driving element further includes a second gate electrode facing the first gate electrode, a sampling reinforcement voltage for increasing a sampling current flowing in the driving element is applied to the second gate electrode of the driving element in the sampling period preceding the emission period, and an image quality compensation voltage which is lower than the sampling reinforcement voltage is applied to the second gate electrode of the driving element in a programming period between the sampling period and the emission period.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
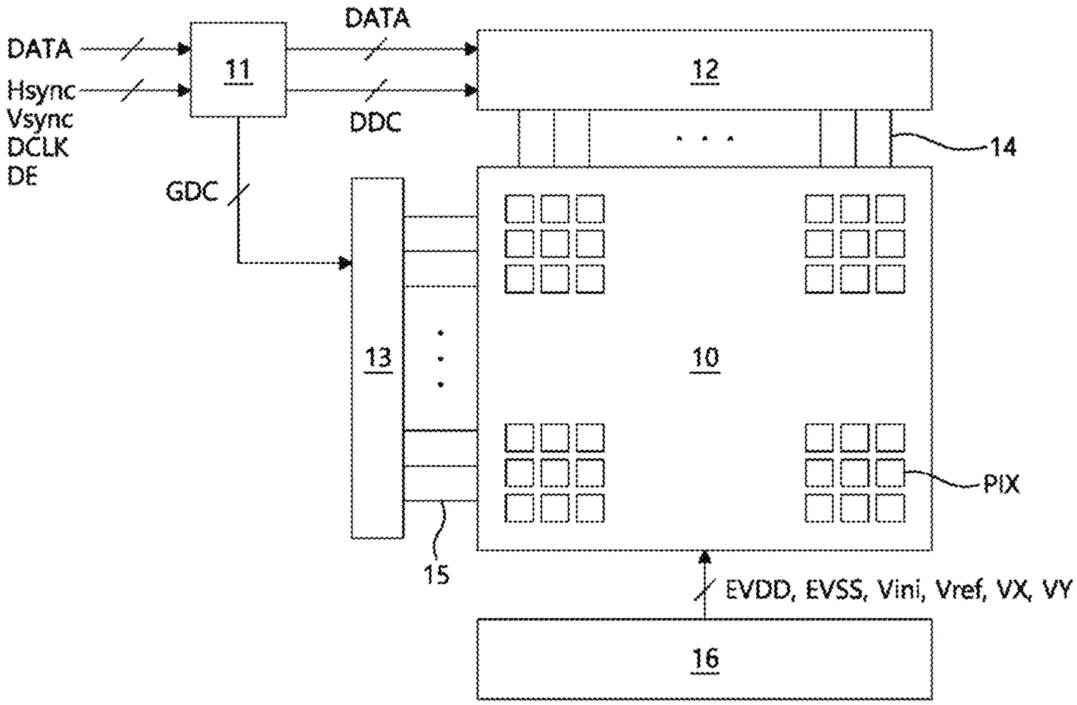
FIG. 1 is a block diagram illustrating an electroluminescent display apparatus according to an embodiment of the present disclosure.

Hereinafter, the present disclosure will be described more fully with reference to the accompanying drawings, in which exemplary embodiments of the disclosure are shown. Like reference numerals refer to like elements throughout. In the following description, when the detailed description of the relevant known function or configuration is determined to unnecessarily obscure the important point of the specification, the detailed description will be omitted. Hereinafter, embodiments of the specification will be described in detail with reference to the accompanying drawings.

In an electroluminescent display apparatus, a pixel circuit may include one or more of an N-channel (NMOS) transistor and a P-channel (PMOS) transistor. The transistor may be a three-electrode element which includes a gate, a source, and a drain. The source may be an electrode which supplies a carrier to a transistor. In the transistor, a carrier may start to flow from the source. The drain may be an electrode which enables the carrier to flow out from the transistor. In the transistor, the carrier flows from the source to the drain. In the N-channel transistor, because a carrier is an electron, a source voltage may have a voltage that is less than a drain voltage so that the electron flows from the source to the drain. In the N-channel transistor, a current may flow from the drain to the source. In the P-channel transistor, because a carrier is a hole, a source voltage may be greater than a drain voltage so that the hole flows from the source to the drain. In the P-channel transistor, because the hole flows from the source to the drain, a current may flow from the source to the drain. It should be noted that a source and a drain of a transistor are not fixed. For example, the source and the drain of the transistor may switch based on a voltage applied thereto. Therefore, the present disclosure is not limited due to a source and a drain of a transistor.

A gate signal applied to pixels may swing between a gate on voltage and a gate off voltage. The gate on voltage may be set to a voltage which is greater than a threshold voltage of a transistor, and the gate off voltage may be set to a voltage which is less than the threshold voltage of the transistor. The transistor may be turned on in response to the gate on voltage and may be turned off in response to the gate off voltage. In the N-channel transistor, the gate on voltage may be a gate high voltage (VGH), and the gate off voltage may be a gate low voltage (VGL). In the P-channel transistor, the gate on voltage may be the gate low voltage (VGL), and the gate off voltage may be the gate high voltage (VGH).

FIG. 1 is a block diagram illustrating an electroluminescent display apparatus according to an embodiment of the present disclosure.

Referring to FIG. 1, the electroluminescent display apparatus according to an embodiment of the present disclosure may include a display panel 10, a timing controller 11, a data driver 12, a gate driver 13, and a power circuit 16. In FIG. 1, all or some of the timing controller 11, the data driver 12, and the power circuit 16 may be integrated into a drive integrated circuit (IC).

In a screen displaying an input image in the display panel 10, first signal lines 14 extending in a column direction (or a vertical direction) may intersect with second signal lines 15 extending in a row direction (or a horizontal direction), and pixels PIX may be arranged as a matrix type in intersection areas between the first and second signal lines 14 and 15 to configure a pixel array. The first signal lines 14 may be data lines to which data voltages are supplied, and the second signal lines 15 may be gate lines to which gate signals are supplied.

The pixel array may include a plurality of pixel lines. Here, a pixel line may not denote a physical signal line and may be defined as a pixel set of pixels of one line arranged adjacent to one another in a horizontal direction or a pixel block of one line. The pixels PIX may be grouped into a plurality groups and may display various colors. When a pixel group for color expression is defined as a unit pixel, one unit pixel may include red (R), green (G), and blue (B) pixels, and moreover, may further include a white (W) pixel.

Each of the pixels PIX may include a light emitting device and a driving element which generates a driving current with a gate-source voltage thereof to drive the light emitting device.

The light emitting device may include an anode electrode, a cathode electrode, and an organic compound layer formed between the electrodes. The organic compound layer may include a hole injection layer (HIL), a hole transport layer (HTL), an emission layer (EML), an electron transport layer (ETL), and an electron injection layer (EIL), but is not limited thereto. When a driving current flows in the light emitting device, a hole passing through the hole transport layer (HTL) and an electron passing through the electron transport layer (ETL) may move to the emission layer (EML) to generate an exciton, and thus, the emission layer (EML) may emit visible light.

The driving element may be implemented as a thin film transistor (TFT). An electrical characteristic (for example, a threshold voltage) of the driving element should be uniform in all pixels PIX, but there may be a difference between the pixels PIX due to a process deviation. The electrical characteristic of the driving element may be changed due to a degradation which occurs as a display driving time elapses, but in a change degree, there may be a difference between the pixels PIX. In order to compensate for an electrical characteristic deviation of the driving element, internal compensation technology may be applied to the electroluminescent display apparatus. The internal compensation technology may sample the threshold voltage of the driving element by using an internal compensation circuit included in the pixel PIX and may reflect the sampled threshold voltage in the gate-source voltage of the driving element, thereby compensating for the electrical characteristic deviation of the driving element so that a threshold voltage variation of the driving element does not affect a driving current. The internal compensation circuit may include a plurality of switch elements, each implemented as a TFT, and one or more capacitors.

Each of a driving element and switch elements included in a pixel circuit may be implemented as an oxide transistor. The oxide transistor may use, as a semiconductor material, oxide such as indium gallium zinc oxide (IGZO) where indium (In), gallium (Ga), zinc (Zn), and oxide (O) are combined, instead of polysilicon. An electron mobility of the oxide transistor may be 10 or more times greater than an electron mobility of an amorphous silicon transistor and may be lower in manufacturing cost than a low temperature polysilicon (LTPS) transistor. Also, because the oxide transistor is low in off current, driving stability and reliability may be high in low speed driving where an off period of a transistor is relatively long. Accordingly, the oxide transistor may be applied to a large-screen and high-resolution display panel where low power driving is needed or a screen size is not adjusted by an LTPS process.

However, the electron mobility of the oxide transistor may be greater than that of the amorphous silicon transistor and may be less than that of the LTPS transistor. Therefore, comparing with the LTPS transistor, the oxide transistor may have a drawback where a sampling speed of a threshold voltage of a driving element is relatively slow in performing an internal compensation operation. When the threshold voltage of the driving element is not sufficiently sampled for a predetermined sampling time, a threshold voltage variation may not be accurately compensated for. Such a problem may severely occur when a sampling time is short, and for example, when a large-screen and high-resolution display panel is driven at a high speed.

In order to solve such a problem, the pixel circuit according to the present embodiments may use a double-gate driving element which include a first gate electrode supplied with a data voltage and a second gate electrode facing the first gate electrode and may increase a sampling current flowing in the driving element for the predetermined sampling time by applying a sampling reinforcement voltage to the second gate electrode of the driving element.

Furthermore, in a specific embodiment among a plurality of embodiments described below, the pixel circuit may increase a threshold voltage sampling speed by applying the sampling reinforcement voltage to the second gate electrode of the driving element for the predetermined sampling time, and then, may apply an image quality compensation voltage, which is less than the sampling reinforcement voltage, to the second gate electrode of the driving element for a programming time succeeding the predetermined sampling time, thereby lowering a slope of a characteristic curve of the driving element to prevent display smear from occurring in emitting light.

Touch sensors for sensing a touch input may be further disposed on the pixel array of the display panel 10. The touch sensors may be embedded in the pixel array.

The pixel array may further include first power lines to which a high level driving voltage EVDD is supplied, second power lines to which a low level driving voltage EVSS is supplied, third power lines to which an initial voltage Vini is supplied, and fourth power lines to which a reference voltage Vref is supplied. In a specific embodiment among a plurality of embodiments described below, the third power lines may be omitted, and in this case, the initial voltage Vini may be supplied to the pixels PIX through the first signal lines 14 (see FIG. 7). Also, the second power lines may be replaced with a single-body electrode connected to the light emitting device, on or under the light emitting device.

The first to fourth power lines may be connected to the power circuit 16.

The power circuit 16 may adjust a direct current (DC) input voltage provided from a host system (not shown) by using a DC-DC converter to generate the gate on voltage VGH and the gate off voltage VGL needed for operations of the data driver 12 and the gate driver 13 and generate the high level driving voltage EVDD, the initial voltage Vini, the reference voltage Vref, and the low level driving voltage EVSS needed for pixel driving. In a specific embodiment among a plurality of embodiments described below, the power circuit 16 may include an external power source for generating the sampling reinforcement voltage (see FIG. 2) and may include an external power source for generating the image quality compensation voltage (see FIG. 7).

The high level driving voltage EVDD may be greater than the initial voltage Vini, and the initial voltage Vini may be greater than the reference voltage Vref. The reference voltage Vref may be less than or equal to the low level driving voltage EVSS.

The timing controller 11 may supply digital image data DATA transferred from the host system (not shown). The timing controller 11 may receive a timing signal such as a vertical synchronization signal Vsync, a horizontal synchronization signal Hsync, a data enable signal DE, and a dot clock DCLK from the host system to generate timing control signals for controlling operation timings of the data driver 12 and the gate driver 13. The timing control signals may include a gate timing control signal GDC for controlling an operation timing of the gate driver 13 and a data timing control signal DDC for controlling an operation timing of the data driver 12.

The data driver 12 may sample and latch the digital image data DATA input from the timing controller 11 on the basis of the data control signal DDC to generate parallel data, convert the digital image data DATA into analog data voltages on the basis of a gamma reference voltage by using a digital-to-analog converter (DAC), and supply the analog data voltages to the pixels PIX through the first signal lines 14. The data voltages may be analog gamma compensation voltages corresponding to image gray levels which are to be expressed in the pixels PIX. The data driver 12 may be configured with a plurality of source driver ICs.

The source driver IC may include a shift register, a latch, a level shifter, a DAC, and an output buffer. The shift register may shift a clock input from the timing controller 11 to sequentially output a clock for data sampling, the latch may sample and latch the digital image data DATA at a sampling clock timing sequentially input from the shift register to simultaneously output the latched image data DATA, the level shifter may adjust the voltage of the image data, input from the latch, to within an input voltage range of the DAC, and the DAC may convert the image data DATA from the level shifter into data voltages and may supply the data voltages to the first signal lines 14 through an output buffer. In a specific embodiment among a plurality of embodiments described below, the source driver IC may receive the initial voltage from the power circuit 60 and may alternately supply the data voltages and the initial voltage to the first signal lines 14 (see FIGS. 7 and 8).

The gate driver 13 may generate gate signals on the basis of the gate control signal GDC and may supply the gate signals to the second signal lines 15. The gate driver 13 may include a plurality of gate driver ICs which each include a gate shift register, a level shifter for converting an output signal of the gate shift register to a swing width suitable for TFT driving of a pixel, and an output buffer. Also, the gate driver 13 may be directly provided on a substrate of the display panel 10 on the basis of a gate driver in panel (GIP) type. In the GIP type, the level shifter may be mounted on a printed circuit board (PCB), and the gate shift register may be provided in a bezel area which is a non-display area of the display panel 10.

The gate shifter register may include a plurality of output stages which are connected to one another on the basis of a cascade scheme. The output stages may be independently connected to gate lines and may output gate signals to the gate lines. The number of gate signals and output stages for driving pixels PIX arranged in one pixel line may be determined based on the number of gate lines corresponding thereto.

In some embodiments described below, output stages, gate signals, and second signal lines 15 for driving pixels PIX arranged in one pixel line may each be provided as three (see FIGS. 2 to 5).

In some embodiments described below, output stages, gate signals, and second signal lines 15 for driving pixels PIX arranged in one pixel line may each be provided as five (see FIG. 7).

The host system may be an application processor (AP) in a mobile device, a wearable device, and a virtual/augmented reality device. Also, the host system may be a main board such as a television system, a set-top box, a navigation system, a personal computer (PC), and a home theater system, but is not limited thereto.

Figure 2:
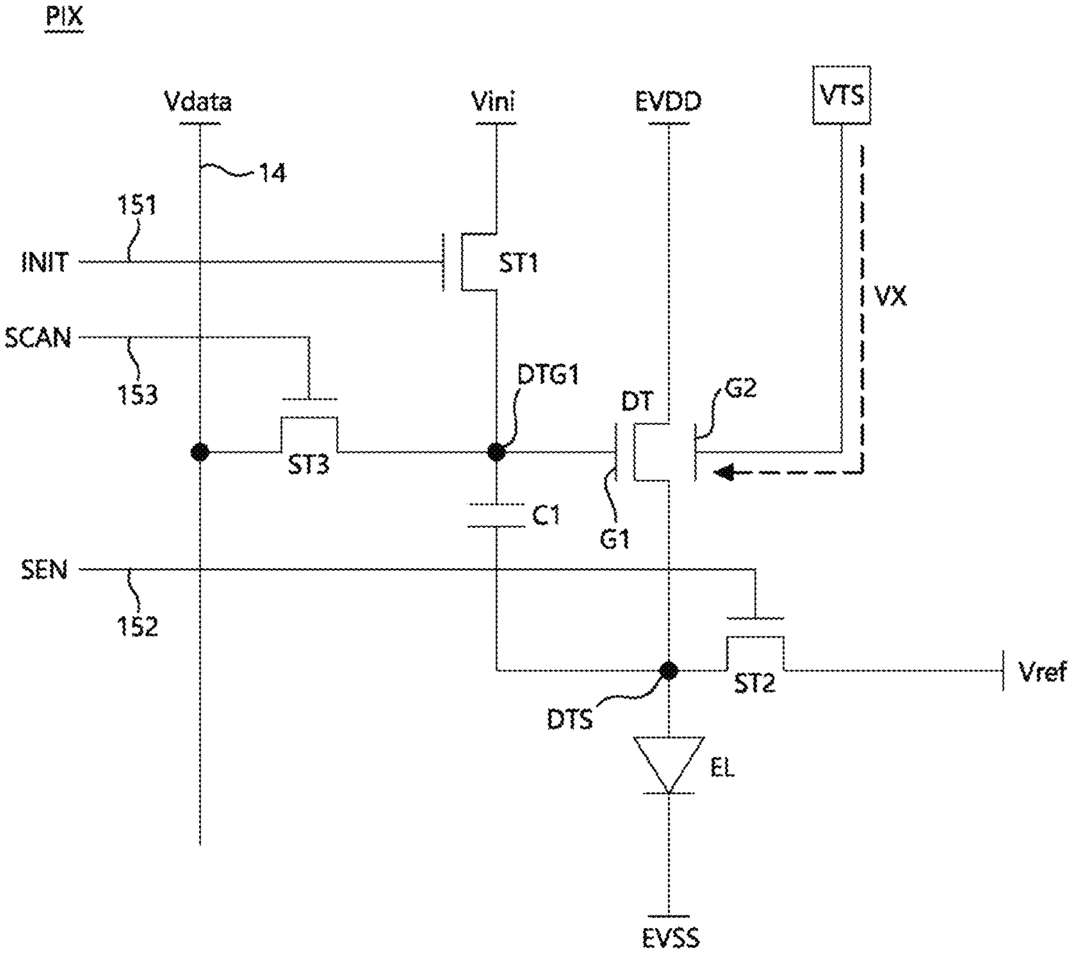
FIG. 2 is an equivalent circuit diagram of a pixel according to a first embodiment.
Figure 6:
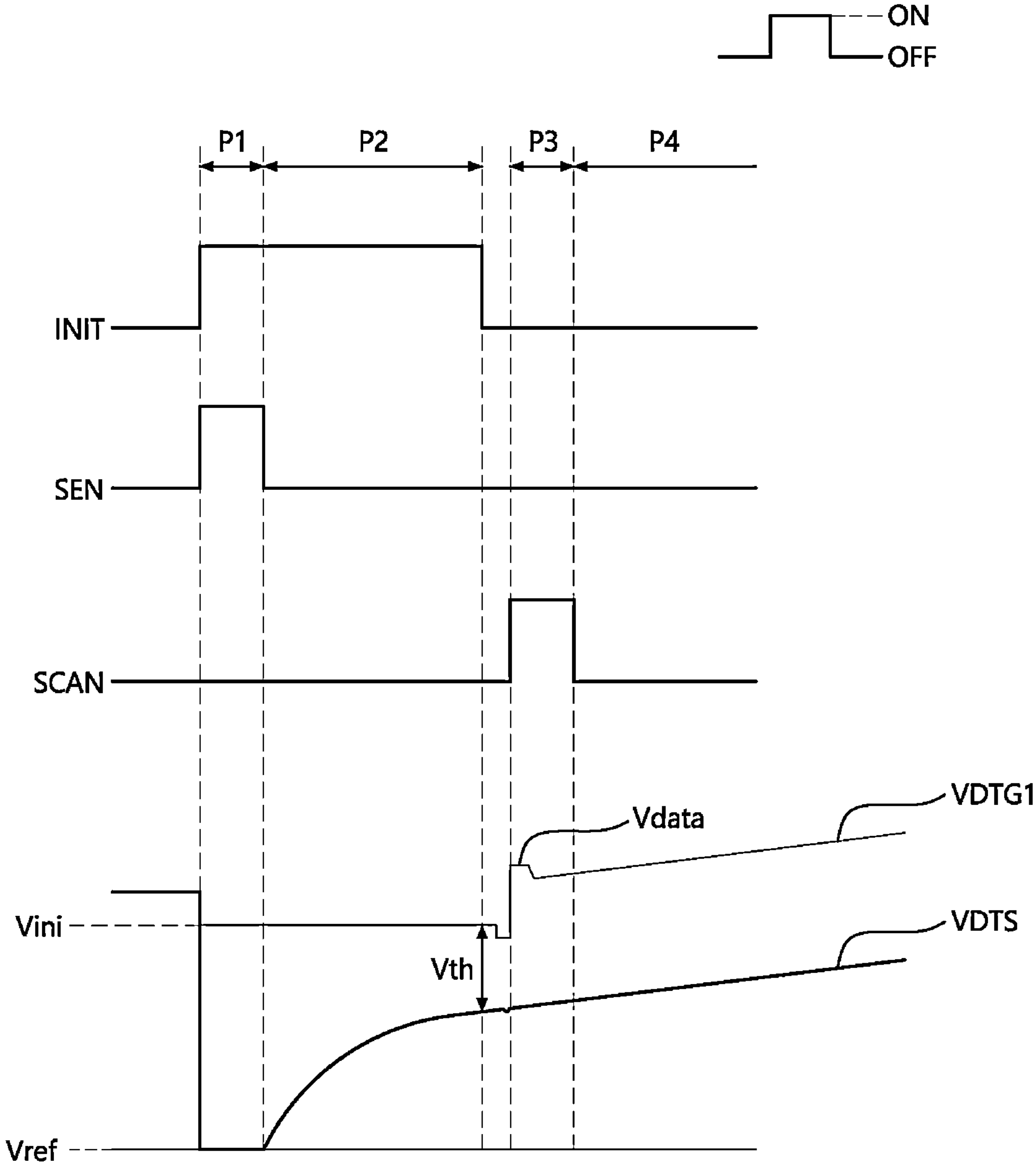
FIG. 6 is a driving waveform diagram of the pixel according to the first embodiment to the fourth embodiment.

FIG. 2 is an equivalent circuit diagram of a pixel according to a first embodiment. FIG. 6 is a driving waveform diagram of the pixel according to the first embodiment.

Referring to FIG. 2, a pixel PIX may include a driving element DT, a light emitting device EL, and an internal compensation circuit. The pixel PIX, as shown in FIG. 6, may be driven in the order of an initial period P1, a sampling period P2, a programming period P3, and an emission period P4.

The driving element DT may generate a driving current for driving the light emitting device EL in the emission period P4. A first gate electrode G1 of the driving element DT may be connected to a first gate node DTG1, a drain electrode thereof may be connected to an input terminal for the high level driving voltage EVDD, and a source electrode thereof may be connected to a source node DTS.

The driving element DT may further include a second gate electrode G2 facing the first gate electrode G1. The second gate electrode G2 of the driving element DT may be connected to an external power source VTS, and in the sampling period P2 for sampling a threshold voltage Vth of the driving element DT, the second gate electrode G2 may be supplied with a sampling reinforcement voltage VX from the external power source VTS. The sampling reinforcement voltage VX may increase a sampling current flowing in the driving element DT in the sampling period P2 to increase a sampling speed of the threshold voltage Vth of the driving element DT. When a sampling speed of the driving element DT increases, the threshold voltage Vth of the driving element DT may be accurately sampled in a high-resolution and high-speed model where the sampling period P2 is short.

The light emitting device EL may be connected between the source node DTS and an input terminal for the low level driving voltage EVSS, and in the emission period P4, may emit light with the driving current from the driving element DT. The light emitting device EL may include an anode electrode connected to the source node DTS, a cathode electrode connected to the input terminal for the low level driving voltage EVSS, and an emission layer between the electrodes. The light emitting device EL may be implemented as an organic light emitting diode including an organic emission layer, or may be implemented as an inorganic light emitting diode including an inorganic emission layer.

The internal compensation circuit may be for compensating for a threshold voltage variation of the driving element DT. The internal compensation circuit may sample the threshold voltage Vth of the driving element DT in the sampling period P2 and may reflect the sampled threshold voltage Vth in a gate-source voltage Vgs (or VDTG1−VDTS) of the driving element DT, and thus, may compensate for the threshold voltage variation of the driving element DT so that the threshold voltage variation of the driving element DT does not affect the driving current.

Moreover, the internal compensation circuit may initialize the first gate node DTG1 and the source node DTS of the pixel PIX in the initial period P1 and may apply a data voltage Vdata to the first gate node DTG1 in the programming period P3 to program the gate-source voltage Vgs of the driving element DT on the basis of the driving current. In the emission period P4, the light emitting device EL may emit light with the driving current which has been programmed in the programming period P3. In the emission period P4, an equation of the driving current contributing to light emission of the light emitting device EL may be $K(Vgs-Vth)^2$. Here, K may denote a constant value which is determined based on the electron mobility and channel capacity of the driving element. In the equation of the driving current, because the threshold voltage Vth of the driving element DT is previously reflected in the gate-source voltage Vgs of the driving element DT, the driving current may not be affected by the threshold voltage Vth of the driving element DT, and thus, a variation of the threshold voltage Vth of the driving element DT may be compensated for.

The internal compensation circuit may include a first capacitor C1 connected between the first gate node DTG1 and the source node DTS and may further include a first switch element ST1, a second switch element ST2, and a third switch element ST3.

The first capacitor C1 may store the threshold voltage Vth of the driving element DT sampled in the sampling period P2 to reflect the threshold voltage Vth of the driving element DT in the gate-source voltage Vgs of the driving element DT and may further store the data voltage Vdata to further reflect the data voltage Vdata in the gate-source voltage Vgs of the driving element DT in the programming period P3. By using the first capacitor C1, the threshold voltage Vth of the driving element DT and the data voltage Vdata may be reflected in the gate-source voltage Vgs of the driving element DT in the programming period P3.

In response to a first gate signal INIT, the first switch element ST1 may apply the initial voltage Vini to the first gate node DTG1 up to the sampling period P2 from the initial period P1. The initial voltage Vini may be a sufficiently high voltage for turning on the driving element DT. A gate electrode of the first switch element DT1 may be connected to a first gate line 151, a drain electrode thereof may be connected to an input terminal for the initial voltage Vini, and a source electrode thereof may be connected to the first gate node DTG1.

The first gate signal INIT input through the first gate line 151 may be input at an on level up to the sampling period P2 from the initial period P1 and may be input at an off level up to the emission period P4 from the programming period P3. In response to the first gate signal INIT, the first switch element ST1 may be turned on up to the sampling period P2 from the initial period P1 and may be turned off up to the emission period P4 from the programming period P3.

In response to a second gate signal SEN, the second switch element ST2 may apply the reference voltage Vref, which is less than the initial voltage Vini, to the source node DTS in the initial period P1. The reference voltage Vref may be a sufficiently low voltage for turning on the driving element DT. That is, a difference voltage between the initial voltage Vini and the reference voltage Vref may be sufficiently greater than the threshold voltage Vth of the driving element DT. A gate electrode of the second switch element ST2 may be connected to a second gate line 152, a drain electrode thereof may be connected to an input terminal for the reference voltage Vref, and a source electrode thereof may be connected to the source node DTS.

The second gate signal SEN input through the second gate line 152 may be input at an on level in only the initial period P1 and may be input at an off level in the other periods P2 to P4. In response to the second gate signal SEN, the second switch element ST2 may be turned on in only the initial period P1 and may be turned off in the other periods P2 to P4.

In response to a third gate signal, the third switch element ST3 may apply the data voltage Vdata, corresponding to image data, to the first gate node DTG1 in the third programming period P3. A gate electrode of the third switch element ST3 may be connected to a third gate line 153, a drain electrode thereof may be connected to a data line 14, and a source electrode thereof may be connected to the first gate node DTG1.

A third gate signal SCAN input through the third gate line 153 may be input at an on level in only the programming period P3 and may be input at an off level in the other periods P1, P2, and P4. In response to the third gate signal SCAN, the third switch element ST3 may be turned on in only the programming period P3 and may be turned off in the other periods P1, P2, and P4.

In the pixel PIX, as in FIG. 6, when the gate-source voltage Vgs of the driving element DT is set to "Vini−Vref" on the basis of an on operation condition in the initial period P1, a sampling current may flow between the drain and the source of the driving element DT on the basis of the on operation in the sampling period P2. A voltage level of the source node DTS of the driving element DT may increase toward a voltage level (i.e., the initial voltage Vini) of the first gate node DTG1 on the basis of the sampling current, and the threshold voltage Vth of the driving element DT may be sampled in the sampling period P2.

When the sampling period P2 is short or the electron mobility of the driving element DT is low, it may be difficult to accurately sample the threshold voltage Vth of the driving element DT in the sampling period P2 predetermined. In order to solve such a problem, the sampling reinforcement voltage VX may be applied from the external power source VTS to the second gate electrode G2 of the driving element DT. When the sampling reinforcement voltage VX is applied to the second gate electrode G2 of the driving element DT, the sampling current may increase in the sampling period P2, and thus, the threshold voltage Vth of the driving element DT may be quickly and accurately sampled.

The inventors have performed an experiment to confirm a voltage application condition where a sampling current is highest in the sampling period P2. The voltage application condition may allow the same voltage to be applied to the first and second gate electrodes G1 and G2 of the driving element DT. Accordingly, the sampling reinforcement voltage VX may be applied at the same voltage level as the initial voltage Vini, and the first and second gate electrodes G1 and G2 may be equipotential in the sampling period P2.

The threshold voltage Vth of the driving element DT and the data voltage Vdata may be reflected in the gate-source voltage Vgs of the driving element DT in the programming period P3, and in the emission period P4, the light emitting device EL may emit light with the driving current irrelevant to the threshold voltage Vth of the driving element DT.

Figure 3:
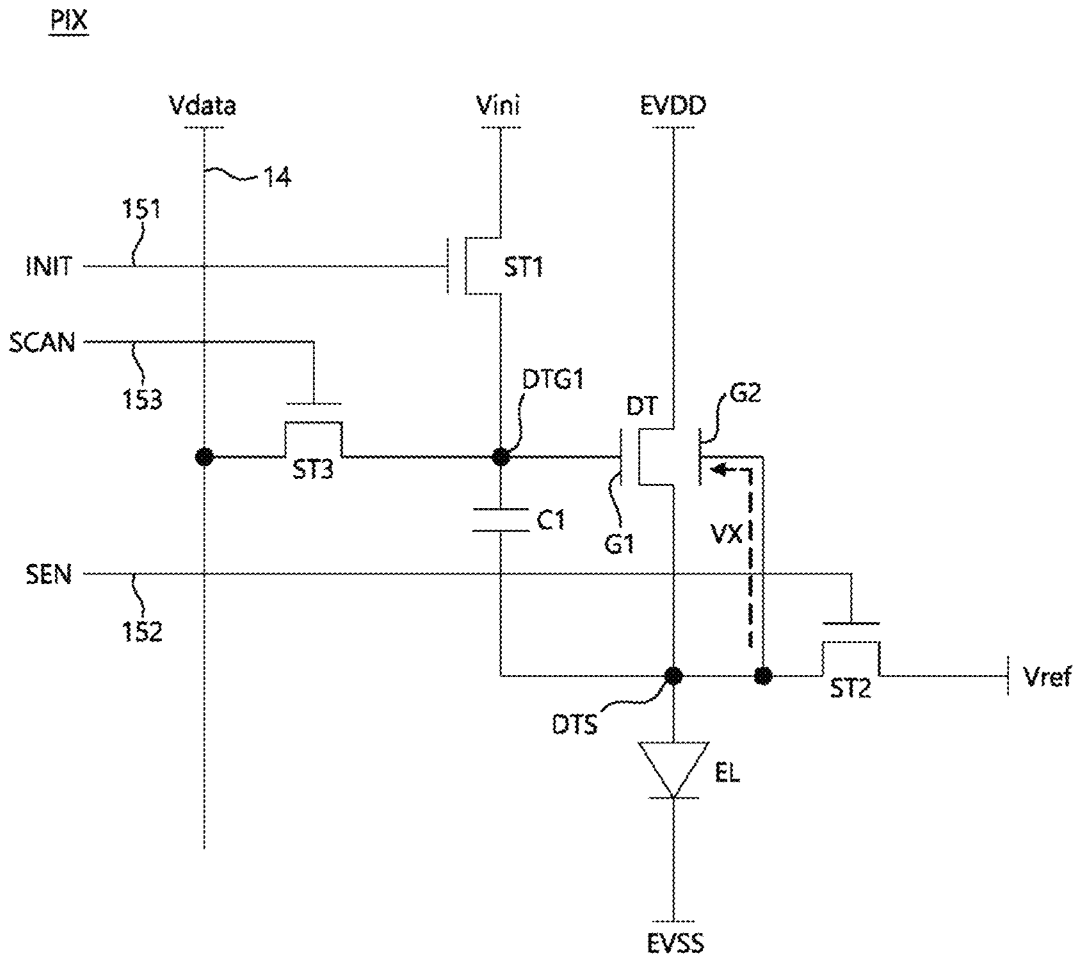
FIG. 3 is an equivalent circuit diagram of a pixel according to a second embodiment.

FIG. 3 is an equivalent circuit diagram of a pixel according to a second embodiment. FIG. 6 is a driving waveform diagram of the pixel according to the second embodiment.

A pixel PIX of FIG. 3 may differ from the pixel PIX of FIG. 2 in terms of a connection configuration of the second gate electrode G2 of the driving element DT, and in the other elements except the connection configuration, the pixel PIX of FIG. 3 may be substantially the same as the pixel PIX of FIG. 2.

Referring to FIGS. 3 and 6, a second gate electrode G2 of a driving element DT may be connected to a source electrode of the driving element DT and may be supplied with the sampling reinforcement voltage VX from a source node DTS of the driving element DT during the sampling period P2. When the second gate electrode G2 and the source electrode of the driving element DT are connected to each other, a separate power line for a connection with an external power source may be omitted, and the pixel array may be simplified.

In the sampling period P2, the sampling reinforcement voltage VX applied from the source electrode of the driving element DT may be a variable voltage which increases toward the initial voltage Vini. That is, in the sampling period P2, the sampling reinforcement voltage VX may increase up to a saturation voltage from the reference voltage Vref, and the saturation voltage may be lower than the initial voltage Vini by a threshold voltage Vth of the driving element.

Because a voltage at a second gate electrode G2 of the driving element DT increases toward the initial voltage Vini during the sampling period P2, a sampling current may increase, and sampling performance may be enhanced.

Figure 4:
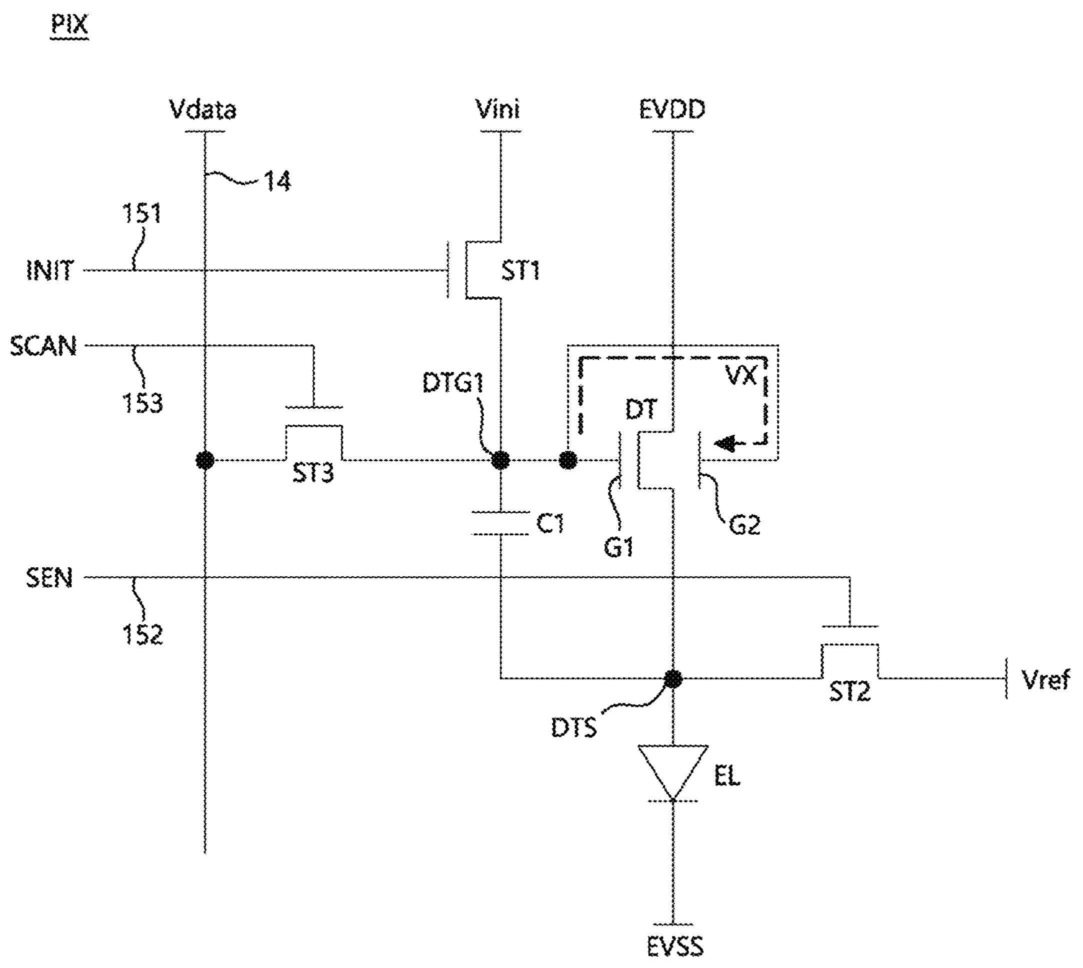
FIG. 4 is an equivalent circuit diagram of a pixel according to a third embodiment.

FIG. 4 is an equivalent circuit diagram of a pixel according to a third embodiment. FIG. 6 is a driving waveform diagram of the pixel according to the third embodiment.

A pixel PIX of FIG. 4 may differ from the pixel PIX of FIG. 2 in terms of a connection configuration of the second gate electrode G2 of the driving element DT, and in the other elements except the connection configuration, the pixel PIX of FIG. 4 may be substantially the same as the pixel PIX of FIG. 2.

Referring to FIGS. 4 and 6, a second gate electrode G2 of a driving element DT may be connected to a first gate electrode G1 of the driving element DT and may be supplied with the sampling reinforcement voltage VX from the first gate electrode G1 of the driving element DT during the sampling period P2. When first and second gate electrodes G1 and G2 of the driving element DT are connected to each other, a separate power line for a connection with an external power source may be omitted, and the pixel array may be simplified.

In the sampling period P2, the first and second gate electrodes G1 and G2 of the driving element DT may have the same voltage (for example, the initial voltage Vini). When the first and second gate electrodes G1 and G2 of the driving element DT are equipotential during the sampling period P2, the sampling current may be maximum, and sampling performance may be maximized.

Figure 5:
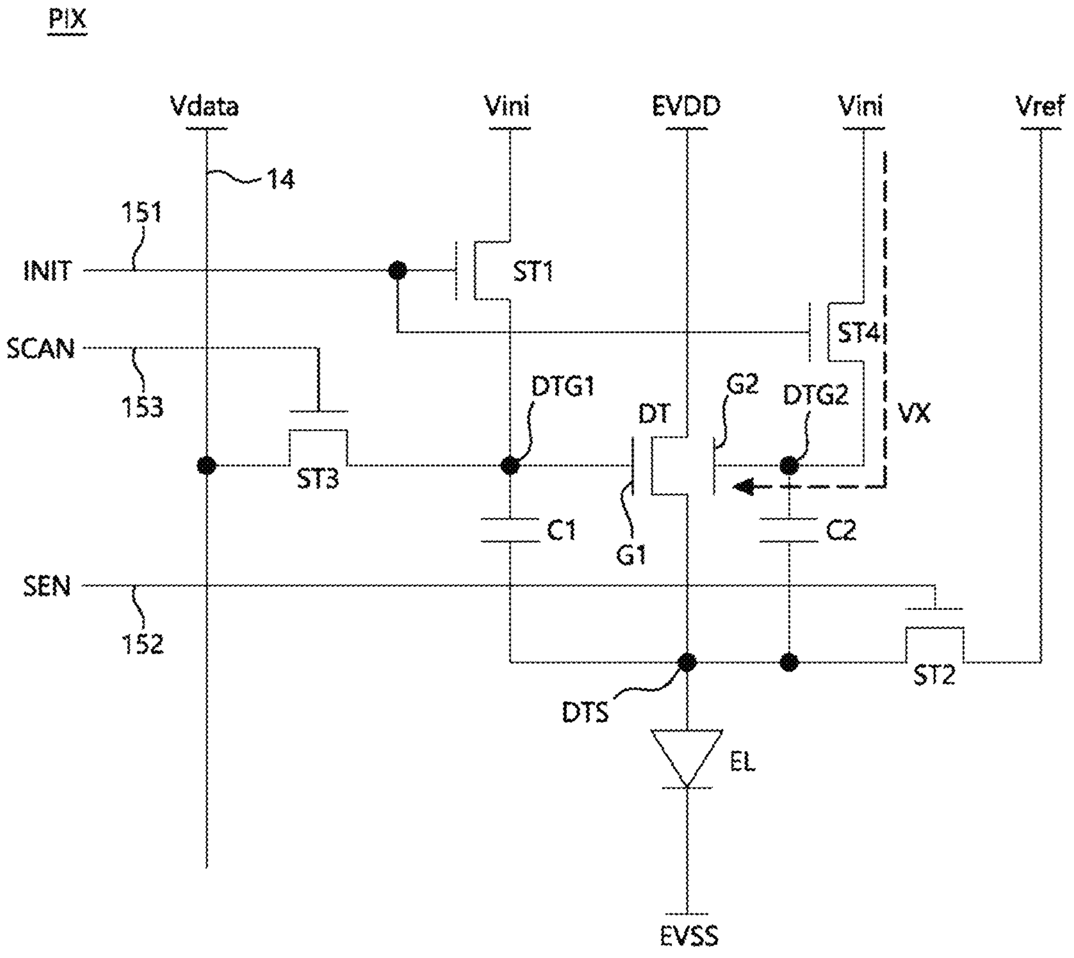
FIG. 5 is an equivalent circuit diagram of a pixel according to a fourth embodiment.

FIG. 5 is an equivalent circuit diagram of a pixel according to a fourth embodiment. FIG. 6 is a driving waveform diagram of the pixel according to the fourth embodiment.

A pixel PIX of FIG. 5 may differ from the pixel PIX of FIG. 2 in terms of a connection configuration of the second gate electrode G2 of the driving element DT, and in the other elements except the connection configuration, the pixel PIX of FIG. 5 may be substantially the same as the pixel PIX of FIG. 2.

Comparing with the pixel PIX of FIG. 2, the pixel PIX of FIG. 5 may further include a second capacitor C2 and a fourth switch element ST4. The second capacitor C2 and the fourth switch element ST4 may be included in an internal compensation circuit of the pixel PIX, and the stability of a pixel operation associated with the supply and storage of the sampling reinforcement voltage VX may increase.

The second capacitor C2 may be connected to a source node DTS of a driving element DT and a second gate node DTG2 connected to a second gate electrode G2 of the driving element DT. The second capacitor C2 may store the sampling reinforcement voltage VX applied to the second gate electrode G2 in the sampling period P2.

In response to the first gate signal INIT, the fourth switch element ST4 may apply the initial voltage Vini to the second gate node DTG2 up to the sampling period P2 from the initial period P1. A gate electrode of the fourth switch element ST4 may be connected to a first gate line 151, a drain electrode thereof may be connected to an input terminal for the initial voltage Vini, and a source electrode thereof may be connected to the second gate node DTG2. In response to the first gate signal INIT, the fourth switch element ST4 may be turned on up to the sampling period P2 from the initial period P1 and may be turned off up to the emission period P4 from the programming period P3.

The second gate electrode G2 of the driving element DT may be supplied with the initial voltage Vini as the sampling reinforcement voltage VX through the fourth switch element ST4 during the sampling period P2. In the sampling period P2, the first and second gate electrodes G1 and G2 of the driving element DT may have the same voltage (for example, the initial voltage Vini). When the first and second gate electrodes G1 and G2 of the driving element DT are equipotential during the sampling period P2, the sampling current may be maximum, and sampling performance may be maximized.

Figure 7:
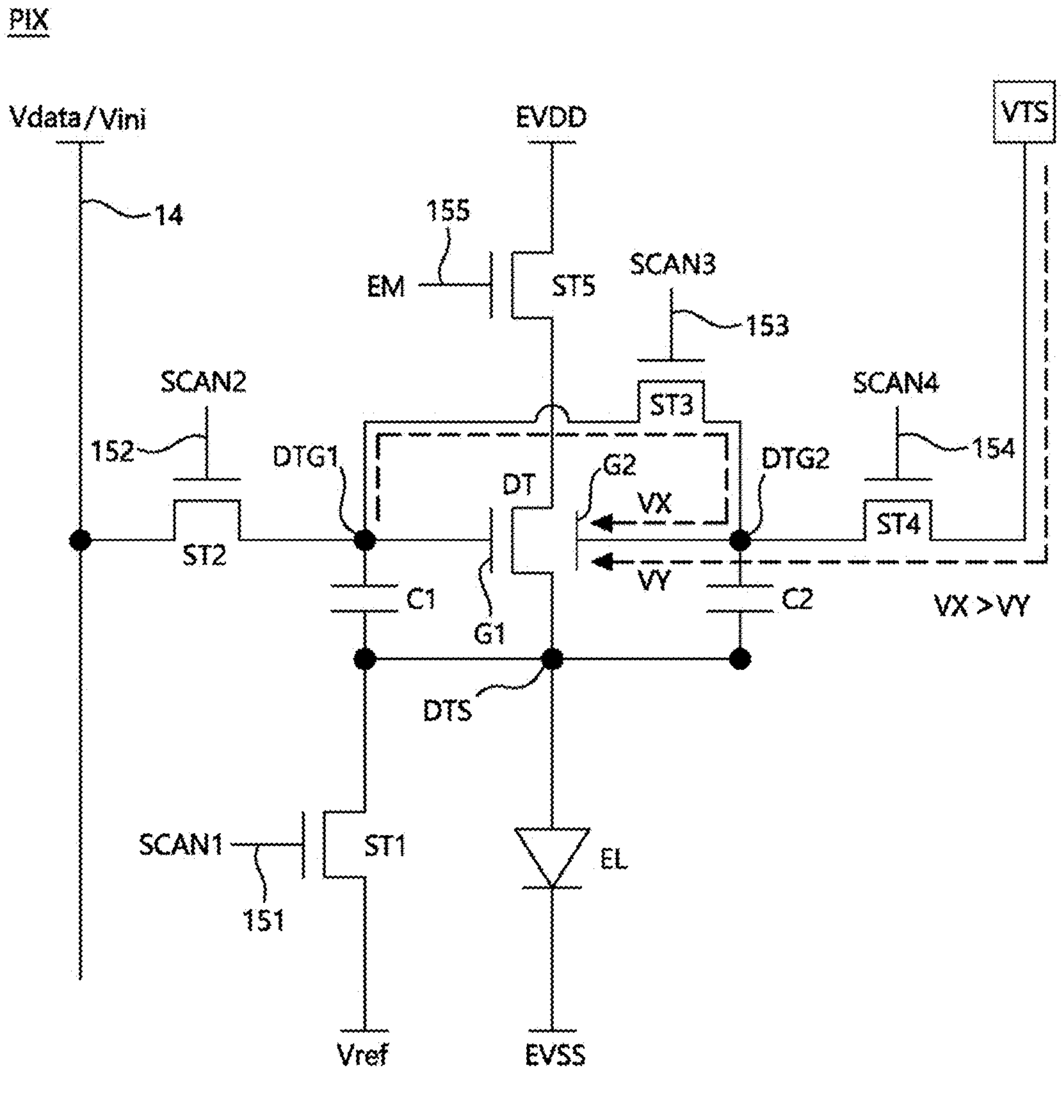
FIG. 7 is an equivalent circuit diagram of a pixel according to a fifth embodiment.
Figure 8:
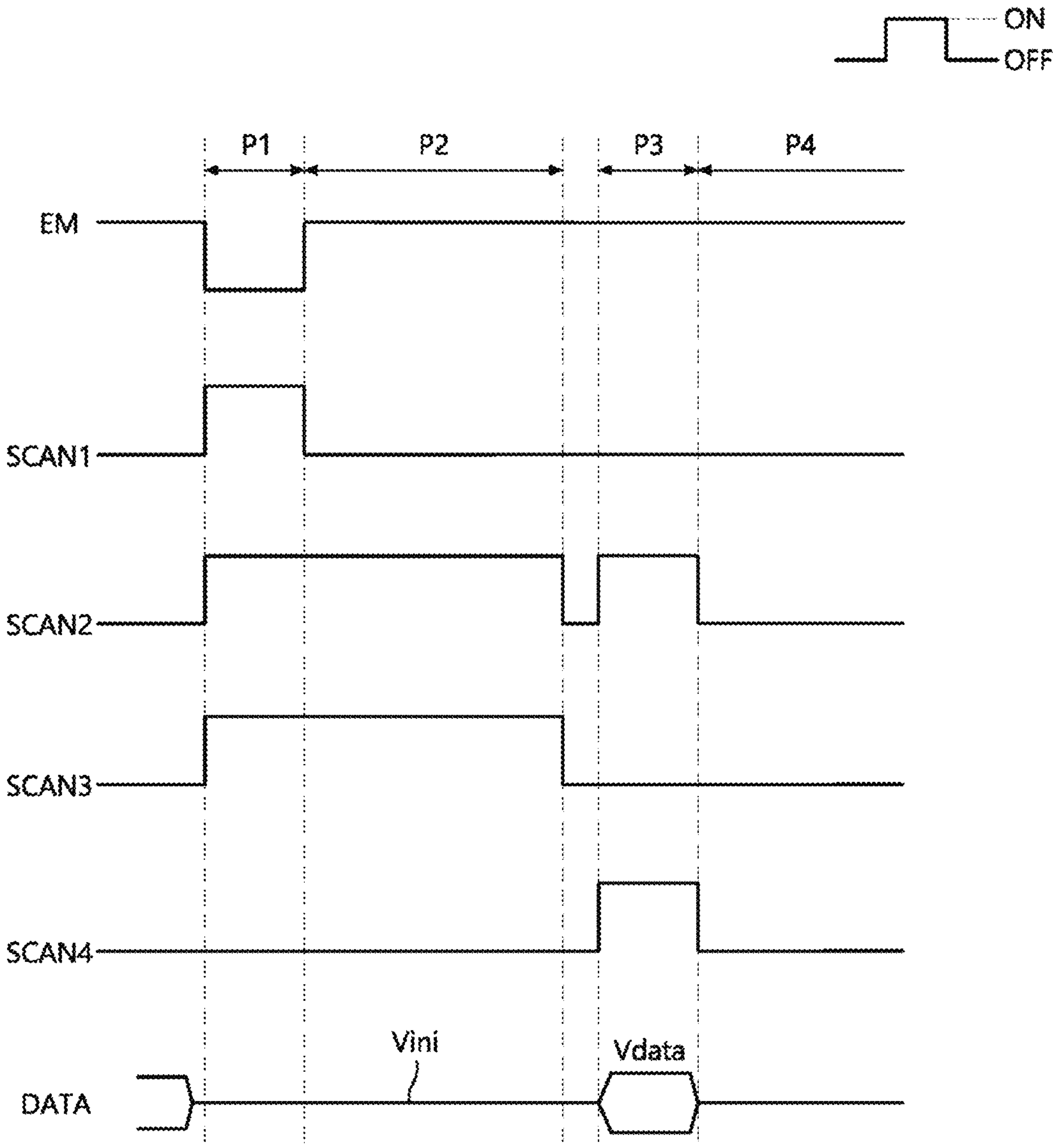
FIGS. 8 and 9 are driving waveform diagrams of the pixel according to the fifth embodiment.
Figure 9:
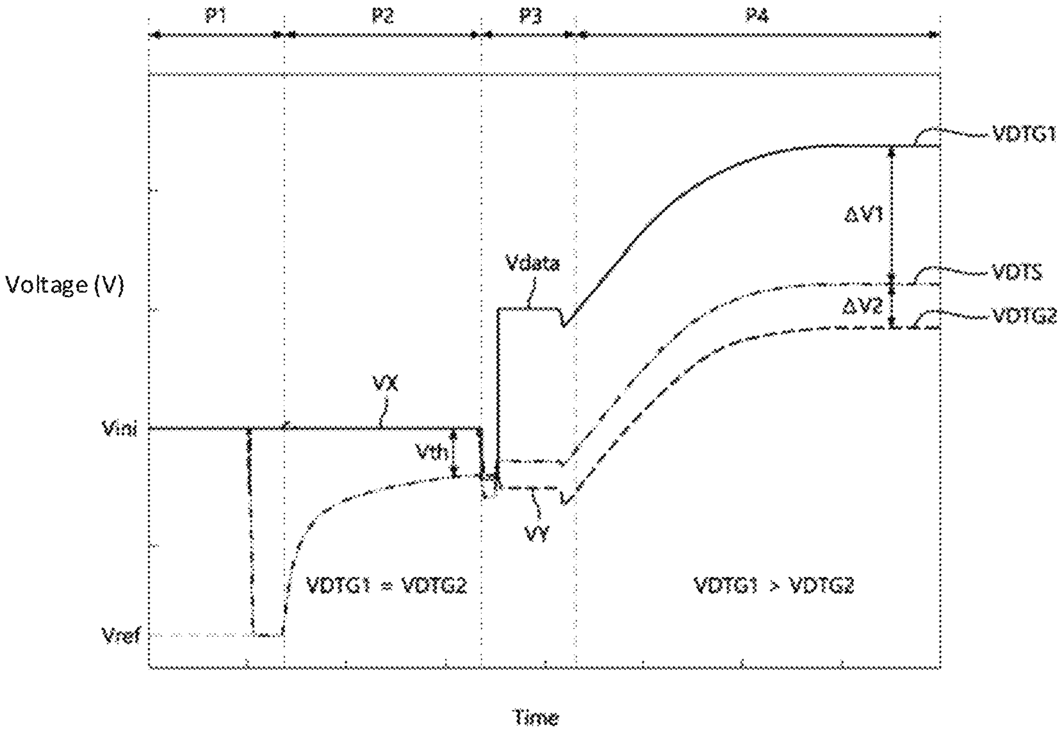
Figure 10:
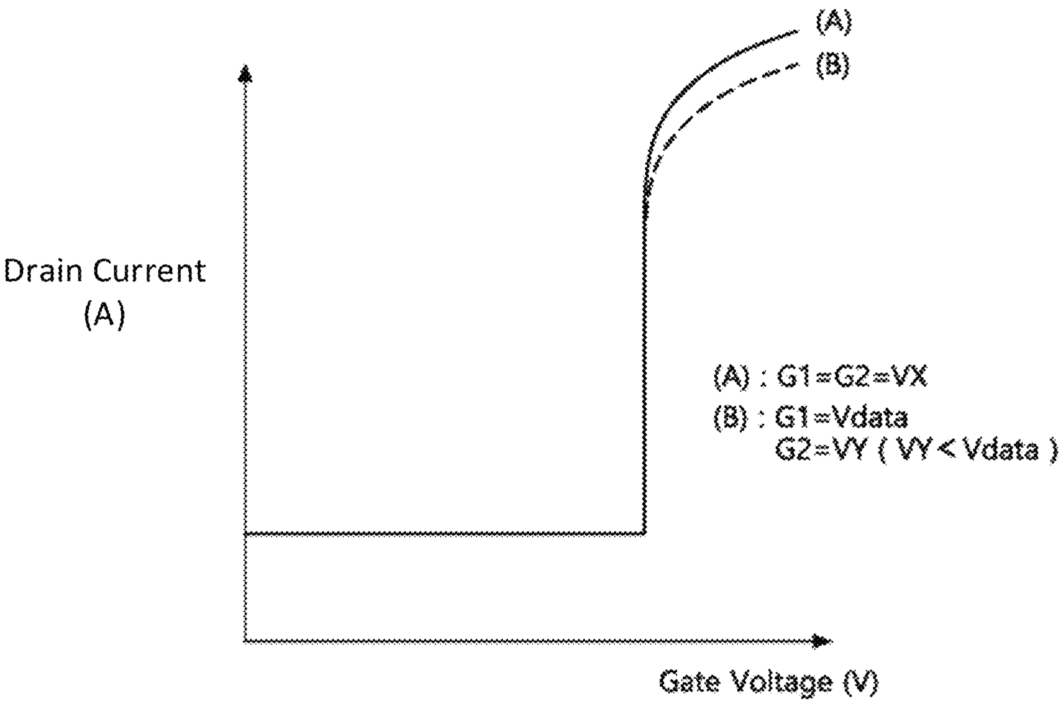
FIG. 10 is a diagram showing a characteristic curve of a driving element included in the pixel according to the fifth embodiment.

FIG. 7 is an equivalent circuit diagram of a pixel according to a fifth embodiment. FIGS. 8 and 9 are driving waveform diagrams of the pixel according to the fifth embodiment. FIG. 10 is a diagram showing a characteristic curve of a driving element included in the pixel according to the fifth embodiment.

Referring to FIG. 7, a pixel PIX may include a driving element DT, a light emitting device EL, and an internal compensation circuit. The pixel PIX, as shown in FIG. 8, may be driven in the order of an initial period P1, a sampling period P2, a programming period P3, and an emission period P4.

The driving element DT may generate a driving current for driving the light emitting device EL in the emission period P4. A first gate electrode G1 of the driving element DT may be connected to a first gate node DTG1, a high level driving voltage EVDD may be input to a drain electrode thereof, and a source electrode thereof may be connected to a source node DTS.

The driving element DT may further include a second gate electrode G2 facing the first gate electrode G1. The second gate electrode G2 of the driving element DT may be supplied with a sampling reinforcement voltage VX in the sampling period P2 for sampling a threshold voltage Vth of the driving element DT and may be supplied with an image quality compensation voltage VY, which is less than the sampling reinforcement voltage VX, in the programming period P3 succeeding the sampling period P2. The sampling reinforcement voltage VX may increase a sampling current flowing in the driving element DT in the sampling period P2 to increase a sampling speed of the threshold voltage Vth of the driving element DT. When a sampling speed of the driving element DT increases, the threshold voltage Vth of the driving element DT may be accurately sampled in a high-resolution and high-speed model where the sampling period P2 is short. The image quality compensation voltage VY may allow a voltage level of the second gate electrode G2 of the driving element DT to be lower than that of the first gate electrode G1 of the driving element DT in the programming period P3, thereby preventing the occurrence of display smear.

The light emitting device EL may be connected between the source node DTS and an input terminal for the low level driving voltage EVSS, and in the emission period P4, may emit light with the driving current from the driving element DT. The light emitting device EL may include an anode electrode connected to the source node DTS, a cathode electrode connected to the input terminal for the low level driving voltage EVSS, and an emission layer between the electrodes. The light emitting device EL may be implemented as an organic light emitting diode including an organic emission layer, or may be implemented as an inorganic light emitting diode including an inorganic emission layer.

The internal compensation circuit may be for compensating for a threshold voltage variation of the driving element DT. The internal compensation circuit may sample the threshold voltage Vth of the driving element DT in the sampling period P2, on the basis of the initial voltage Vini applied as the sampling reinforcement voltage VX to first and second gate nodes DTG1 and DTG2 of the pixel PIX and may reflect the sampled threshold voltage Vth in a gate-source voltage Vgs (or VDTG1−VDTS) of the driving element DT, and thus, may compensate for the threshold voltage variation of the driving element DT so that the threshold voltage variation of the driving element DT does not affect the driving current.

Moreover, the internal compensation circuit may initialize the source node DTS and the first and second gate nodes DTG1 and DTG2 of the pixel PIX in the initial period P1 and may apply a data voltage Vdata, which is greater than the initial voltage Vini, to the first gate electrode G1 of the driving element DT in the programming period P3 to program the gate-source voltage Vgs of the driving element DT on the basis of the driving current. Also, in the programming period P3, the internal compensation circuit may apply the image quality compensation voltage VY, which is lower than the initial voltage Vini, to the second gate electrode G2 of the driving element DT to program the gate-source voltage Vgs of the driving element DT on the basis of the driving current. The image quality compensation voltage VY may be less than the sampling reinforcement voltage VX.

In the emission period P4, the light emitting device EL may emit light with the driving current which has been programmed in the programming period P3. In the emission period P4, an equation of the driving current contributing to light emission of the light emitting device EL may be $K(Vgs-Vth)^2$. Here, K may denote a constant value which is determined based on the electron mobility and channel capacity of the driving element. In the equation of the driving current, because the threshold voltage Vth of the driving element DT is previously reflected in the gate-source voltage Vgs of the driving element DT, the driving current may not be affected by the threshold voltage Vth of the driving element DT, and thus, a variation of the threshold voltage Vth of the driving element DT may be compensated for.

The internal compensation circuit may include a first capacitor C1 connected between the first gate node DTG1 and the source node DTS and may further include a first switch element ST1, a second switch element ST2, a third switch element ST3, a fourth switch element ST4, a fifth switch element ST5, and a second capacitor C2.

The first capacitor C1 may store the threshold voltage Vth of the driving element DT sampled in the sampling period P2 to reflect the threshold voltage Vth of the driving element DT in the gate-source voltage Vgs of the driving element DT and may further store the data voltage Vdata to further reflect the data voltage Vdata in the gate-source voltage Vgs of the driving element DT in the programming period P3. By using the first capacitor C1, the threshold voltage Vth of the driving element DT and the data voltage Vdata may be reflected in the gate-source voltage Vgs of the driving element DT in the programming period P3.

In response to a first gate signal SCAN1, the first switch element ST1 may apply the reference voltage Vref to the source node DTS in the initial period P1. The reference voltage Vref may be a voltage which is sufficiently less than the initial voltage Vini, in order to turn off the light emitting device EL. A gate electrode of the first switch element DT1 may be connected to a first gate line 151, a drain electrode thereof may be connected to an input terminal for the reference voltage Vref, and a source electrode thereof may be connected to the source node DTS.

The first gate signal SCAN1 input through the first gate line 151 may be input at an on level in only the initial period P1 and may be input at an off level in the other periods P2 to P4. In response to the first gate signal SCAN1, the first switch element ST1 may be turned on in only the initial period P1 and may be turned off in the other periods P2 to P4.

In response to a second gate signal SCAN2, the second switch element ST2 may apply the initial voltage Vini to the first gate node DTG1 up to the sampling period P2 from the initial period P1 and may apply a data voltage Vdata to the first gate node DTG1 in the programming period P3. The initial voltage Vini may be a sufficiently high voltage for turning on the driving element DT. That is, a difference voltage between the initial voltage Vini and the reference voltage Vref may be sufficiently greater than the threshold voltage Vth of the driving element DT. The data voltage Vdata may correspond to image data and may be higher than the initial voltage Vini. A gate electrode of the second switch element ST2 may be connected to a second gate line 152, a drain electrode thereof may be connected to a data line 14, and a source electrode thereof may be connected to the first gate node DTG1.

The second gate signal SCAN2 input through the second gate line 152 may be input at an on level in the initial period P1, the sampling period P2, and the programming period P3 and may be input at an off level in the emission period P4. In response to the second gate signal SCAN2, the second switch element ST2 may be turned on in the initial period P1, the sampling period P2, and the programming period P3 and may be turned off in the emission period P4.

In response to a third gate signal SCAN3, the third switch element ST3 may electrically short-circuit the first and second gate electrodes G1 and G2 of the driving element DT up to the sampling period P2 from the initial period P1 and may electrically disconnect the first gate electrode G1 of the driving element DT from the second gate electrode G2 of the driving element DT up to the emission period P4 from the programming period P3. When the first and second gate electrodes G1 and G2 of the driving element DT are short-circuited with each other in the sampling period P2, the initial voltage Vini may be applied as the sampling reinforcement voltage VX to the second gate electrode G2 of the driving element DT. In the sampling period P2, the first and second gate electrodes G1 and G2 of the driving element DT may have the same voltage (for example, the initial voltage Vini).

A gate electrode of the third switch element ST3 may be connected to a third gate line 153, a drain electrode thereof may be connected to the first gate node DTG1, and a source electrode thereof may be connected to the second gate node DTG2. In response to the third gate signal SCAN3, the third switch element ST3 may be turned on up to the sampling period P2 from the initial period P1 and may be turned off up to the emission period P4 from the programming period P3.

In response to the fourth gate signal SCAN4, the fourth switch element ST4 may apply the image quality compensation voltage VY, which is less than the initial voltage Vini, to the second gate electrode G2 of the driving element DT in the programming period P3.

A gate electrode of the fourth switch element ST4 may be connected to a fourth gate line 154, a drain electrode thereof may be connected to an external power source VTS included in a power circuit, and a source electrode thereof may be connected to the second gate node DTG2. In response to the fourth gate signal SCAN4, the fourth switch element ST4 may be turned on in only the programming period P3 and may be turned off in the other periods P1, P2, and P4.

In response to a fifth gate signal SCAN5, the fifth switch element ST5 may electrically disconnect the drain electrode of the driving element DT from an input terminal for the high level driving voltage EVDD in the initial period P1 and may apply the high level driving voltage EVDD to the drain electrode of the driving element DT up to the emission period P4 from the sampling period P2.

A gate electrode of the fifth switch element ST5 may be connected to a fifth gate line 155, a drain electrode thereof may be connected to the input terminal for the high level driving voltage EVDD, and a source electrode thereof may be connected to the drain electrode of the driving element DT. In response to the fifth gate signal SCAN5, the fifth switch element ST5 may be turned off in only the initial period P1 and may be turned on in the other periods P1, P2, and P4.

The second capacitor C2 may be connected to the second gate node DTG2 and the source node DTS. The second capacitor C2 may store the sampling reinforcement voltage VX in the sampling period P2 and may store the image quality compensation voltage VY in the programming period P3.

In the pixel PIX, as in FIGS. 7 and 8, when the gate-source voltage Vgs of the driving element DT is set to "Vini−Vref" on the basis of an on operation condition in the initial period P1, a sampling current may flow between the drain and the source of the driving element DT on the basis of the on operation in the sampling period P2. A voltage level of the source node DTS of the driving element DT may increase toward a voltage level (i.e., the initial voltage Vini) of the first gate node DTG1 on the basis of the sampling current, and the threshold voltage Vth of the driving element DT may be sampled in the sampling period P2.

When the sampling period P2 is short or the electron mobility of the driving element DT is low, it may be difficult to accurately sample the threshold voltage Vth of the driving element DT in the sampling period P2 predetermined. In order to solve such a problem, the first and second gate electrodes G1 and G2 of the driving element DT may be short-circuited with each other in the sampling period P2, and thus, the sampling reinforcement voltage VX may be applied from the first gate electrode G1 of the driving element DT to the second gate electrode G2 of the driving element DT. When the sampling reinforcement voltage VX is applied to the second gate electrode G2 of the driving element DT, the sampling current may increase in the sampling period P2, and thus, the threshold voltage Vth of the driving element DT may be quickly and accurately sampled.

Because the sampling reinforcement voltage VX is applied at the same voltage level as the initial voltage Vini and the first and second gate electrodes G1 and G2 are equipotential in the sampling period P2, sampling performance may be maximized. In other words, as in a graph "A"

of FIG. 10, when the first and second gate electrodes G1 and G2 of the driving element DT have the same voltage (for example, the initial voltage Vini (or VX)) in the sampling period P2, the sampling current may be maximum, and sampling performance may be maximized.

The first and second gate electrodes G1 and G2 of the driving element DT may be disconnected from each other in the programming period P3. In the programming period P3, the data voltage Vdata which is higher than the initial voltage Vini may be applied to the first gate electrode G1 of the driving element DT, and the image quality compensation voltage VY which is lower than the initial voltage Vini may be applied to the second gate electrode G2 of the driving element DT.

The image quality compensation voltage VY, the data voltage Vdata, and the sampled threshold voltage Vth of the driving element DT may be further reflected in the gate-source voltage Vgs of the driving element DT, and in the emission period P4, the light emitting device EL may emit light with the driving current irrelevant to the threshold voltage Vth of the driving element DT.

Moreover, the image quality compensation voltage VY may allow a voltage level of the second gate electrode G2 of the driving element DT to be less than that of the first gate electrode G1 of the driving element DT in the programming period P3, thereby preventing the occurrence of display smear and increasing image quality. In other words, as in a graph "B" of FIG. 10, when the first and second gate electrodes G1 and G2 of the driving element DT have different voltages (for example, the data voltage Vdata and the image quality compensation voltage VY (VY<Vdata) in the programming period P3, a variation slope of a drain current with respect to a gate voltage may be reduced in a characteristic curve of the driving element, and thus, the occurrence of display smear may be prevented.

The present embodiment may realize the following effects.

In the present embodiment, a threshold voltage of a driving element may be sampled and compensated for in an operation process of a pixel, and thus, luminance implemented in the pixel is irrelevant to a variation of the threshold voltage.

In the present embodiment, a sampling current flowing in a driving element may increase by applying a sampling reinforcement voltage to a second gate electrode of the driving element in a sampling process preceding light emission of a pixel, and thus, even when a sampling time is insufficient or the electron mobility of the driving element is low, a threshold voltage of the driving element may be accurately sampled.

In the present embodiment, sampling performance may be maximized by applying the sampling reinforcement voltage to first and second gate electrodes of a driving element in the sampling process preceding light emission of a pixel, and the occurrence of display smear may be prevented by applying an image quality enhancement voltage, which is lower than a data voltage applied to the first gate electrode of the driving element, to the second gate electrode of the driving element in a programming process succeeding the sampling process.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An electroluminescent display apparatus comprising:

a plurality of pixels, each of the plurality of pixels comprising:

a driving element including a first gate electrode connected to a first gate node, a second gate electrode that faces the first gate electrode, a source electrode connected to a source node, and a drain electrode supplied with a high level driving voltage;

a light emitting device connected to the source node and an input terminal that supplies a low level driving voltage, the light emitting device configured to emit light responsive to a driving current applied from the driving element during an emission period; and an internal compensation circuit including a first capacitor connected to the first gate node and the source node, the internal compensation circuit configured to sample a threshold voltage of the driving element to reflect the sampled threshold voltage in a gate-source voltage of the driving element during a sampling period that precedes the emission period, wherein a sampling reinforcement voltage that increases a sampling current flowing in the driving element is applied to the second gate electrode of the driving element during the sampling period, wherein the sampling reinforcement voltage has a same voltage level as an initial voltage applied to the first gate node of the driving element in the sampling period and the first gate electrode and the second gate electrode of the driving element have a same voltage in the sampling period.

2. The electroluminescent display apparatus of claim 1, wherein the internal compensation circuit further comprises:

a first switch element configured to apply the initial voltage to the first gate node up to the sampling period from an initial period that precedes the sampling period responsive to a first gate signal;

a second switch element configured to apply a reference voltage that is less than the initial voltage to the source node during the initial period responsive to a second gate signal; and a third switch element configured to apply a data voltage that corresponds to image data to the first gate node during a programming period that is between the sampling period and the emission period responsive to a third gate signal.

3. The electroluminescent display apparatus of claim 2, wherein the second gate electrode of the driving element is connected to an external power source and is supplied with the sampling reinforcement voltage from the external power source during the sampling period.

4. An electroluminescent display apparatus comprising:

a display panel that comprises a plurality of pixels;

a data driver configured to supply data voltages to the plurality of pixels;

a gate driver configured to supply gate signals to the plurality of pixels;

a timing controller configured to generate timing control signals that control operation timings of the data driver and the gate driver;

a power circuit configured to generate voltage signals needed for operations of the data driver and the gate driver and pixel driving, wherein each of the plurality of pixels comprises:

a driving element including a first gate electrode connected to a first gate node, a second gate electrode that faces the first gate electrode, a source electrode connected to a source node, and a drain electrode supplied with a high level driving voltage;

a light emitting device connected to the source node and an input terminal that supplies a low level driving voltage, the light emitting device configured to emit light responsive to a driving current applied from the driving element during an emission period; and an internal compensation circuit including a first capacitor connected to the first gate node and the source node, the internal compensation circuit configured to sample a threshold voltage of the driving element to reflect the sampled threshold voltage in a gate-source voltage of the driving element during a sampling period that precedes the emission period, wherein a sampling reinforcement voltage that increases a sampling current flowing in the driving element is applied to the second gate electrode of the driving element during the sampling period, and wherein the sampling reinforcement voltage has a same voltage level as an initial voltage applied to the first gate node of the driving element in the sampling period and the first gate electrode and the second gate electrode of the driving element have a same voltage in the sampling period.

5. A pixel comprising:

a driving element including a first gate electrode connected to a first gate node, a second gate electrode that faces the first gate electrode, a source electrode connected to a source node, and a drain electrode supplied with a high level driving voltage;

a light emitting device connected to the source node and an input terminal that supplies a low level driving voltage, the light emitting device configured to emit light responsive to a driving current applied from the driving element during an emission period; and an internal compensation circuit including a first capacitor connected to the first gate node and the source node, the internal compensation circuit configured to sample a threshold voltage of the driving element to reflect the sampled threshold voltage in a gate-source voltage of the driving element during a sampling period that precedes the emission period, wherein a sampling reinforcement voltage that increases a sampling current flowing in the driving element is applied to the second gate electrode of the driving element during the sampling period, and wherein the sampling reinforcement voltage has a same voltage level as an initial voltage applied to the first gate node of the driving element in the sampling period and the first gate electrode and the second gate electrode of the driving element have a same voltage in the sampling period.

* * * * *